Figure 1:
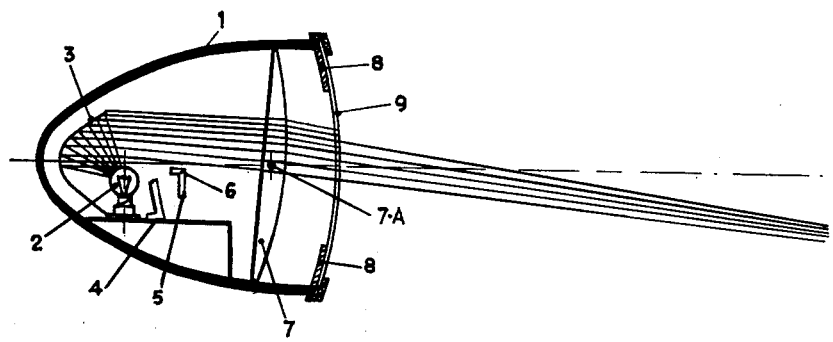

March 10, 1964    G. CANTONI ETAL    3,124,309
ANTI-GLARE HEADLIGHT FOR MOTOR VEHICLES
Filed March 18, 1960

United States Patent Office 3,124,309
Patented Mar. 10, 1964

3,124,309
ANTI-GLARE HEADLIGHT FOR
MOTOR VEHICLES
Giuseppe Cantoni and Giuseppe Cicottino, both of Via Gorizia 26, Novara, Italy, and Luigi Chiesa, Novara, Italy; said Chiesa assignor to said Cantoni
Filed Mar. 18, 1960, Ser. No. 15,983
Claims priority, application Italy Mar. 26, 1959
3 Claims. (Cl. 240—46.03)

This invention relates to an anti-glare headlight for motor vehicles and the like, and refers more particularly to an anti-glare headlight or projector of this type having a great range of the light.

As is well known, the glare of the headlights of automotive vehicles is the greatest difficulty and danger to which drivers travelling during the night are subjected, particularly if they are travelling on two-way roads with heavy traffic. There have been numerous victims of accidents caused by the headlights and included among such victims is a large number of cyclists and motorcyclists, who under all circumstances are poorly visible during darkness and who often appear within the range of view of a driver only when his car is extremely close to them. The danger of an accident in such cases is greatly increased if the driver at that moment is blinded by the glare of a car travelling in the opposite direction.

Due to the importance of this problem of preventing the glare of headlights, many inventors and engineers have suggested numerous solutions thereof. Some of the solutions, while satisfactory from a technical point of view, could not be applied in actual practice, either due to the fact that the installation and use of the proposed devices are too expensive, or for the reason that, in order to be effective, such devices must be used by all vehicles on the road. Typical solutions of this type are whose based upon the use of polarized light which has been suggested in several applications by a number of inventors, but which could not find proper use due to both of the above mentioned difficulties.

Other and more simple solutions which can be more easily applied, are those based simply in the use of specific lights, which due to their geometrical and optical characteristics diminish the glare of the headlights while providing sufficient illumination for the road stretching in front of the driver.

Devices of this type, in order to be satisfactory must not reduce, however, to any large extent the range of the light rays of the headlight, since otherwise the portion of the illuminated road located in front of the driver, becomes insufficient for safe driving, particularly due to the high speed of driving now practised and the fact that the driver must have sufficient time to operate the driving wheel or to apply the brakes when fixed or movable objects appear suddenly before him on the road.

An object of the present invention is to provide an anti-glare headlight which belongs to the constructions of the last-mentioned type, but which is distinguished from prior art constructions in that, on the whole, it provides an illumination of the greatest possible range, while being most effective for eliminating the dangerous glare.

Other objects of the present invention will become apparent in the course of the following specification:

The objects of the present invention may be realized through the provision of an anti-glare headlight having a parabolic casing containing a parabolic mirror with a source of light located close to the focus of this mirror but a little below it. The light from the luminous source is reflected from behind by this parabolic mirror and is covered in the front by a shield which may be partially light transmitting. The light is further covered by an oscillating countershield from which the reflected and diffused light is projected through a special optical prism having a plano-convex section, which is inclined with respect to the optical axis of the parabolic casing at an angle which can be varied at will. The entire apparatus is so designed and constructed that by varying within certain limits, the inclination of the swingable shield and/or that of the prism, it is possible to regulate the upper and lateral limits of the field of view which it is desired to achieve, or to provide a desired boundary between the zone illuminated by the rays of light projected by the headlight and those located in the shadows.

It is advisable to place upon the edge of the front opening of the parabolic casing a further shield which will prevent the passage of the peripheral portions of the rays of light.

Furthermore, the present invention provides means for controlling, either separately or simultaneously, the swingable countershield and the plano-convex prism, whereby such means may be mechanical, electrical, hydraulic, pneumatic or of any other suitable nature depending upon the requirements and the conveniences of the particular installation.

The headlight constructed in accordance with the principles of the present invention will produce rays of light of great intensity and also of great range, in such manner that the upper limit of the light can be varied in height in a suitable manner, so as to prevent the light from glaring into the eyes of a driver travelling in the opposite direction; thus such drivers will not be dazzled by the headlight, although the lower portion of the road will be effectively illuminated for the user of the headlight of the present invention.

The invention will appear more clearly from the following detailed description when taken in connection with the accompanying drawing showing by way of example only, a preferred embodiment of the inventive idea.

Figure 2:
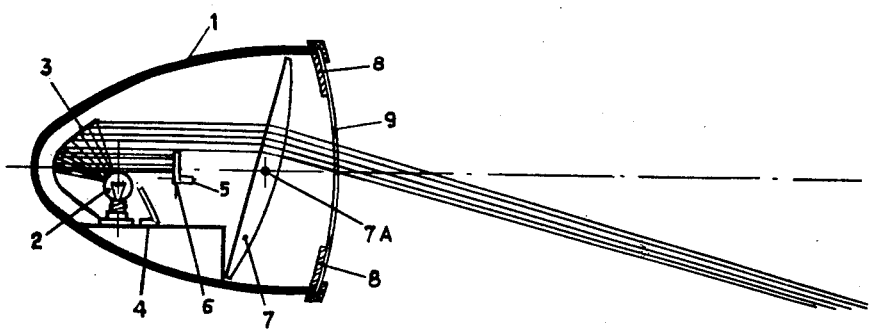

FIGURE 1 of the drawing illustrates diagrammatically partly in section and partly in side elevation, a headlight having a great range of light and constructed in accordance with the principles of the present invention. FIGURE 2 is similar to FIG. 1, but shows the parts in positions used to lower and/or reduce the headlight.

The drawing illustrates a headlight provided with a parabolic casing 1 having a pointed rear and a flat front. Close to the focus of the parabolic casing is disposed a source of light 2. Behind the source of light 2, namely, between the source and the rear of the casing, is located a parabolic mirror 3 which directs the rays of light toward the front of the headlight. The soure of light 2 is located a little below the focus of the parabolic mirror 3. A screen 4 prevents the direct passage of the rays of light from the source 2. The screen 4 may be a partial one and/or it may be fixed. It is inclined at an acute angle in the direction of the light source 2. In front of the screen 4, namely, between the screen 4 and the front of the casing, there is arranged a swingable counterscreen 5 which can oscillate within the casing upon a pivot 6 extending perpendicularly to the optical axis X—X of the casing 1. The counterscren or shield 5 consists of two flat opaque surfaces extending at right angles to each other and swingable by any suitable means which are not illustrated. One of the two surfaces may extend perpendicularly to the optical axis, so as to reduce the projected light rays. The shield 5 along with a plano-convex prism 7 are used to regulate the inclination of the rays of light emitted by the headlight and to limit precisely the height of such rays. As shown in the drawing, the plano-convex prism 7 is inclined at an acute angle in relation to the optical axis X—X of the parabolic casing 1 and is mounted upon a pivot 7A. The flat surface of the prism 7 is directed toward the source of light, while the curved surface of the prism extends outwardly. Normally the prism 7 is in the position shown in FIG. 1 at which time light rays from the light source 2 and the mirror 3 are formed into a headlight which is slightly inclined relatively to the ground surface. On the other hand, when the driver wants to lower the headlight so that it will illuminate only the area closest to the vehicle, the prism 7 will be turned to the position shown in FIG. 2. At the same time the position of the counterscreen or shield 5 will be reversed by moving the shield 5 from the position shown in FIG. 1 to the position shown in FIG. 2, so that the shield 5 will greatly reduce the amount of light rays reaching the prism 7.

The inclination of the prism 7, as well as that of the swingable countershield 5 can be varied by any suitable means.

The parabolic casing 1 carries upon its front an annular limiting screen 8, so that only the central portion of the rays of light is projected by the headlight, while the peripheral rays of light are stopped by the screen 8. Obviously any suitable means not shown in the drawing may be used to turn the shield 5 and the prism 7.

It is apparent that the above example has been given solely by way of illustration and not by way of limitation and that it is subject to many variations and modifications within the scope of the present invention. All such variations and modifications are to be included within the scope of the present invention.

What is claimed is:

1. An anti-glare headlight for motor vehicles and the like, comprising a parabolic casing having a pointed rear and a flat front, a source of light located close to the rear and below the axis of said parabolic casing, a parabolic mirror located between said source of light and the rear of the casing for projecting light emitted by said source toward the front of the casing, the axis of said mirror and the axis of said casing being coincident, a screen located between said source of light and the front of the casing, said screen being inclined at an acute angle to said source of light and being located below the axis of said mirror for restricting the direct projection of light from said source toward the front of the casing, another screen located between the first-mentioned screen and the front of the casing, means pivotally supporting said other screen for swinging movement about an axis extending perpendicularly to the axis of said casing from a first position wherein said other screen extends wholly below said casing axis to a second position wherein said other screen extends partly below and partly above said casing axis to vary the amount of reflected light projected toward the front of the casing, and a plano-convex prism covering the front of the casing and extending at an angle to the axis thereof.

2. An anti-glare headlight for motor vehicles and the like, comprising a parabolic casing having a pointed rear and a flat front opening, a source of light located close to the rear and below the axis of said parabolic casing, a parabolic mirror located between said source of light and the rear of the casing for projecting light emitted by said source toward the front of the casing, the axis of said mirror and the axis of said casing being coincident, a screen located between said source of light and the front of the casing, said screen being inclined at an acute angle to said source of light and being located below the axis of said mirror for restricting the direct projection of light from said source toward the front of the casing, another screen located between the first-mentioned screen and the front of the casing, means pivotally supporting said other screen for swinging movement about an axis extending perpendicularly to the axis of said casing from a first position wherein said other screen extends wholly below said casing axis to a second position wherein said other screen extends partly below and partly above said casing axis to vary the amount of reflected light projected toward the front of the casing, a plano-convex prism covering the front of the casing and extending at an angle to the axis thereof, and an annular screen carried by said casing and enclosing at least a portion of the front opening thereof.

3. An anti-glare headlight for motor vehicles and the like, comprising a parabolic casing having a pointed rear and a flat front, a source of light located close to the rear and below the axis of said parabolic casing, a parabolic mirror located between said source of light and the rear of the casing for projecting light emitted by said source toward the front of the casing, the axis of said mirror and the axis of said casing being coincident, a screen located between said source of light and the front of the casing, said screen being inclined at an acute angle to said source of light and being located below the axis of said mirror for restricting the direct projection of light from said source toward the front of the casing, another screen located between the first-mentioned screen and the front of the casing, means pivotally supporting said other screen for swinging movement about an axis extending perpendicularly to the axis of said casing from a first position wherein said other screen extends wholly below said casing axis to a second position wherein said other screen extends partly below and partly above said casing axis to vary the amount of reflected light projected toward the front of the casing, a plano-convex prism, and means pivotally supporting said prism in said casing for swinging movement about an axis extending perpendicularly to the axis of said casing and in front of said other screen.

References Cited in the file of this patent

UNITED STATES PATENTS

| | | |
|---|---|---|
| 1,230,304 | Kiernan | June 19, 1917 |
| 1,321,418 | Cave | Nov. 11, 1919 |
| 1,393,877 | Allen | Oct. 18, 1921 |
| 1,410,077 | Peck | Mar. 21, 1922 |
| 1,928,431 | Morsehead et al. | Sept. 26, 1933 |
| 2,064,880 | Bostic | Dec. 22, 1936 |
| 2,076,240 | Levy | Apr. 6, 1937 |
| 2,285,408 | Blauvelt | June 9, 1942 |